United States Patent
DeFranks et al.

(10) Patent No.: US 9,861,207 B2
(45) Date of Patent: Jan. 9, 2018

(54) WAVE SPRINGS AND CUSHIONING ARTICLES CONTAINING THE SAME

(71) Applicant: DREAMWELL, LTD., Las Vegas, NV (US)

(72) Inventors: Michael S. DeFranks, Atlanta, GA (US); Rahul Kirtikar, Atlanta, GA (US); Henry J. Marcacci, Atlanta, GA (US); Michael McDonald, Atlanta, GA (US); Nicholas B. Savage, Alpharetta, GA (US); Kevin C. Bogaert, Parsippany, NJ (US); Parker Frost, Marietta, GA (US)

(73) Assignee: DREAMWELL, LTD., Las Vegas, NV (US)

( * ) Notice: Subject to any disclaimer, the term of this patent is extended or adjusted under 35 U.S.C. 154(b) by 291 days.

(21) Appl. No.: 14/695,659

(22) Filed: Apr. 24, 2015

(65) Prior Publication Data

US 2015/0308533 A1    Oct. 29, 2015

Related U.S. Application Data

(60) Provisional application No. 61/983,814, filed on Apr. 24, 2014.

(51) Int. Cl.
*A47C 27/06*    (2006.01)
*F16F 1/02*    (2006.01)
(Continued)

(52) U.S. Cl.
CPC .............. *A47C 27/065* (2013.01); *A47C 7/22* (2013.01); *A47C 27/05* (2013.01); *F16F 1/025* (2013.01)

(58) Field of Classification Search
CPC ..... A47C 27/045; A47C 27/065; A47C 27/05; A47C 23/002; A47C 23/0438;
(Continued)

(56) References Cited

U.S. PATENT DOCUMENTS 52,585 A    2/1866    McClanatham
66,849 A    7/1867    Johnson
(Continued)

FOREIGN PATENT DOCUMENTS

AT    383260 B    6/1987
BE    415647 A    6/1936
(Continued)

OTHER PUBLICATIONS

International Search Report & Written Opinion issued in International Application No. PCT/US2013/070907, dated Feb. 19, 2014; 14 pages.
(Continued)

*Primary Examiner* — Nicholas F Polito
*Assistant Examiner* — Rahib T Zaman
(74) *Attorney, Agent, or Firm* — Cantor Colburn LLP (57) ABSTRACT

Cushioning articles such as mattresses can include a three dimensional wave spring core. The wave spring includes a polymeric lattice spring structure including a plurality of alternating layers stackedly arranged to define a height of the wave spring, wherein each one of the alternating layers is defined by a single strand having one or more upward and downward undulations, wherein the alternating layers are arranged such that an upward undulation of one layer is connected to a downward undulation of the other layer to define a cell configured to receive a compressive force, wherein the lattice structure has a sinusoidal shape when viewed top down and is configured to have three dimensional structure.

19 Claims, 8 Drawing Sheets

(51) Int. Cl.
*A47C 7/22* (2006.01)
*A47C 27/05* (2006.01)

(58) Field of Classification Search
CPC .......... A47C 23/05; A47C 23/20; F16F 1/025; F16F 1/04; F16F 1/14; F16F 1/18; F16F 1/32; F16F 1/34
USPC ................................................. 267/166, 182
See application file for complete search history.

(56) References Cited

U.S. PATENT DOCUMENTS

| | | | |
|---|---|---|---|
| 97,579 A | 12/1869 | Wittram | |
| 1,192,510 A | 7/1916 | Fischmann | |
| 1,248,671 A | 12/1917 | Kelly | |
| 1,475,010 A | 11/1923 | Garbutt | |
| 2,532,425 A | 12/1950 | Sheneker | |
| 2,678,685 A * | 5/1954 | Volsk | A47C 7/282 267/144 |
| 3,081,129 A | 3/1963 | Ridder | |
| 3,252,170 A | 5/1966 | Frye | |
| 3,656,190 A | 4/1972 | Regan et al. | |
| 3,999,234 A | 12/1976 | Regan | |
| 4,449,261 A | 5/1984 | Magnusson | |
| 4,901,987 A * | 2/1990 | Greenhill | F16F 1/06 267/166 |
| 5,558,314 A * | 9/1996 | Weinstein | A47C 23/002 267/142 |
| 5,558,393 A * | 9/1996 | Hawkins | F16F 1/328 267/148 |
| 5,747,140 A * | 5/1998 | Heerklotz | A47C 27/144 248/630 |
| 6,068,250 A * | 5/2000 | Hawkins | F16F 1/328 267/148 |
| 6,487,738 B1 | 12/2002 | Graebe | |
| 6,669,184 B2 * | 12/2003 | Cai | F16F 3/02 267/162 |
| 6,721,981 B1 | 4/2004 | Greenhalgh et al. | |
| 6,742,202 B2 | 6/2004 | Jones | |
| 6,758,465 B1 * | 7/2004 | Greenhill | F16F 1/06 267/162 |
| 6,996,865 B2 | 2/2006 | Sabin | |
| 7,210,181 B1 * | 5/2007 | Price | A47C 23/02 267/162 |
| 7,938,387 B2 * | 5/2011 | Fossati | A47C 23/002 267/142 |
| 8,266,747 B1 | 9/2012 | Sobran et al. | |
| 8,714,531 B2 | 5/2014 | Roma | |
| 2003/0172456 A1 | 9/2003 | Jones | |
| 2004/0231057 A1 | 5/2004 | Sabin | |
| 2008/0098533 A1 | 5/2008 | Erdman et al. | |
| 2010/0071136 A1 * | 3/2010 | Weber | A47C 27/14 5/655.9 |
| 2011/0031665 A1 * | 2/2011 | DeFranks | A47C 23/002 267/144 |
| 2012/0073884 A1 * | 3/2012 | Guthrie | B60G 11/00 177/225 |
| 2013/0096887 A1 * | 4/2013 | Fee | G06F 17/5009 703/1 |
| 2014/0137333 A1 | 5/2014 | Defranks et al. | |
| 2014/0137334 A1 | 5/2014 | Defranks et al. | |
| 2014/0137335 A1 | 5/2014 | Defranks et al. | |
| 2014/0137336 A1 | 5/2014 | Defranks et al. | |
| 2014/0137337 A1 | 5/2014 | Defranks et al. | |

FOREIGN PATENT DOCUMENTS

| | | |
|---|---|---|
| CN | 2129549 Y | 4/1993 |
| EP | 2225973 A2 | 9/2012 |
| FR | 2839429 A1 | 11/2003 |
| GB | 2178307 A | 2/1987 |
| WO | 200016664 A1 | 3/2000 |

OTHER PUBLICATIONS

Office Action and English Translation of Office Action, issued in Chinese Patent Application No. 201380060592.X, dated Sep. 5, 2016; 10 pages.

Search Report issued in European Application No. 16178426.9-1658, dated Oct. 10, 2016; 4 pages.

Notification Concerning Transmittal of International Preliminary Report on Patentability (Chapter I of the Patent Cooperation Treaty), issued in International Application No. PCT/US2013/070907, dated Jun. 4, 2015; 9 pages.

* cited by examiner

WAVE SPRINGS AND CUSHIONING ARTICLES CONTAINING THE SAME

CROSS-REFERENCE TO RELATED APPLICATIONS

This application claims the benefit of U.S. application Ser. No. 61/983,814, filed Apr. 24, 2014, which is incorporated herein by reference in its entirety.

BACKGROUND

The present disclosure generally relates to cushioning articles and more particularly, to cushioning articles including wave springs to provide support to a user thereof. The wave springs generally have an arcuate shape, e.g., an elliptical or parabolic shape.

Cushioning articles such as mattresses have evolved very little in the past fifty years. For example, a standard mattress generally includes a set of metal coil springs mounted either on a base under a foam pad, or sandwiched between a pair of foam pads. The metal springs and foam pad or pads are then covered with a batting material. The entire structure is then sewn into a cloth cover and the edges are wrapped and sewn.

The limitations of metal coil springs combined with improved quality and durability of foam products has led to the relatively recent development of the foam core as a viable alternative to the coil spring especially as it relates to mattresses. A foam core can provide significant improvements in body contour, elimination of pressure points, and improved comfort and support compared to conventional spring-based cushioning articles. For example, a basic foam mattress typically includes one or more layers of foam having desirable properties assembled into a fabric cover which often appears identical to a standard coil metal spring mattress. The foam mattress may include a center core of relatively high resilience foam sandwiched between two layers of lower resilience foam encased in a fabric shell. This construction allows for a reversible mattress.

While the use of foam layers overcomes some of the disadvantages of coil spring, they exhibit other disadvantages including excessive firmness, difficulty adjusting the firmness, and a lack of air flow through the foam core trapping body heat within the mattress. There is, therefore, a continuing need for improved cushioning article designs that overcome the disadvantages of coil springs and multiple foam layers.

BRIEF SUMMARY

Disclosed herein are cushioning articles comprising one or more three dimensional polymeric wave springs for supporting an end user.

In one embodiment, a mattress includes a base foam layer; a sidewall disposed about a perimeter of the base layer to define a cavity having a length, a width and a height dimension; and one or more three dimensional wave springs disposed within the cavity and configured to correspond to the length, the width and the height dimensions of the cavity, the one or more three dimensional wave springs including a lattice structure comprising a plurality of alternating strands stackedly arranged to define a height dimension of the wave spring, wherein each one of the alternating strands has one or more upward and downward undulations arranged such that an upward undulation of one strand is connected to a downward undulation of an adjacent strand to define multiple cells there between arranged in columns and configured to receive a compressive force, wherein the lattice structure further comprises a non-linear shape when viewed top down, e.g., diamond, sinusoidal, and the like, wherein the non-linear shape of the lattice structure defines a length and a width dimension of the one or more three dimensional wave springs.

In another embodiment, a three dimensional polymeric wave spring includes a lattice spring structure formed of a polymer comprising a plurality of alternating strands stackedly arranged to define a height dimension of the wave spring, wherein each one of the alternating strands have one or more upward and downward undulations arranged such that an upward undulation of one strand is connected to a downward undulation of an adjacent strand to define multiple cells there between arranged in columns and configured to receive a compressive force, wherein the lattice structure further comprises a non-linear shape when viewed top down, wherein the non-linear shape of the lattice structure defines a length and a width dimension of the one or more three dimensional wave springs.

The three dimensional lattice spring structure may be formed from individual sheets or from a continuous sheet.

The disclosure may be understood more readily by reference to the following detailed description of the various features of the disclosure and the examples included therein.

BRIEF DESCRIPTION OF THE SEVERAL VIEWS OF THE DRAWINGS

Referring now to the figures wherein the like elements are numbered alike.

DETAILED DESCRIPTION

Figure 1:
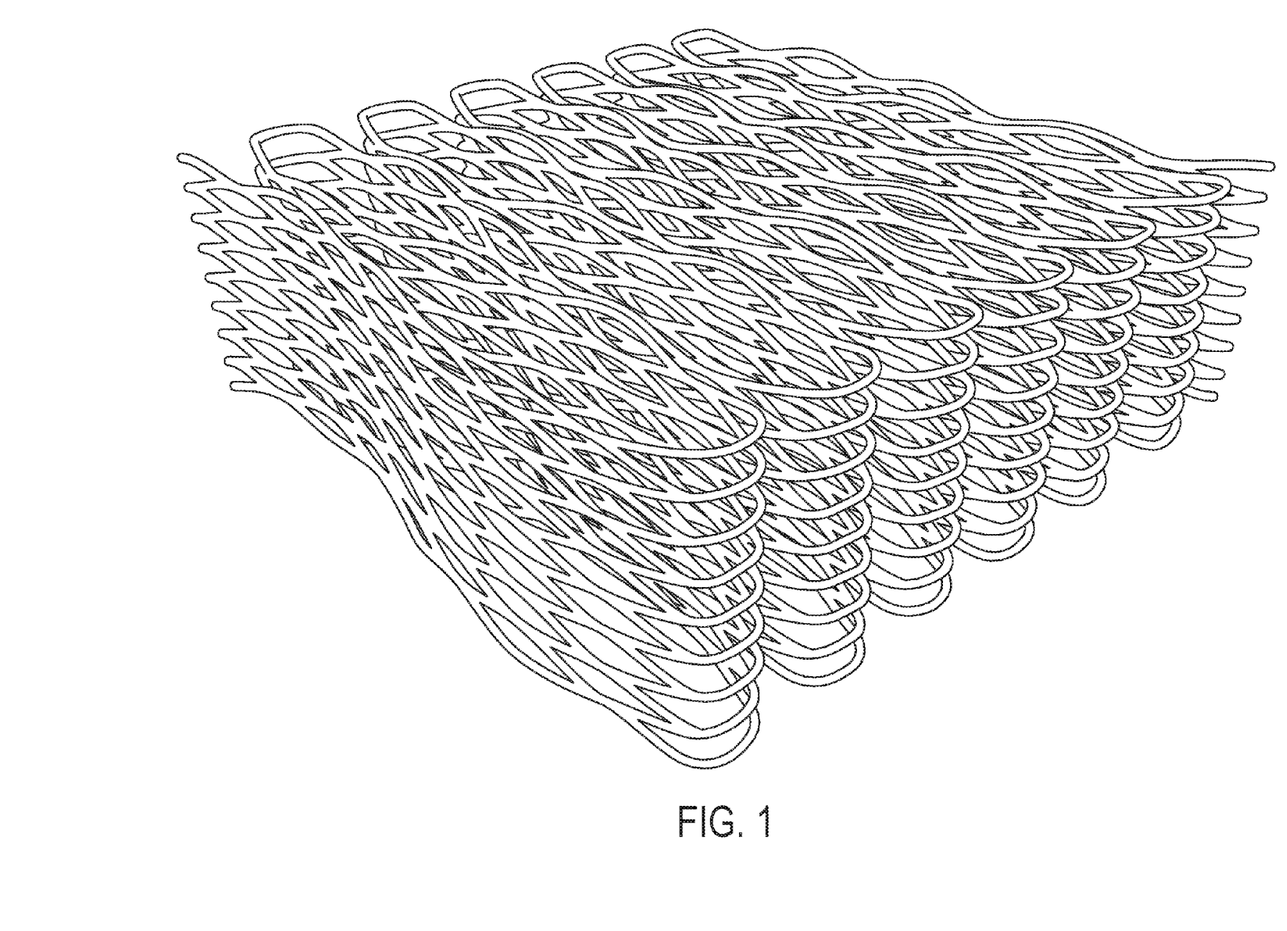
FIG. 1 illustrates a perspective view of a three dimensional polymeric wave spring formed from a continuous sheet of a lattice spring structure in accordance with the present disclosure.
Figure 2:
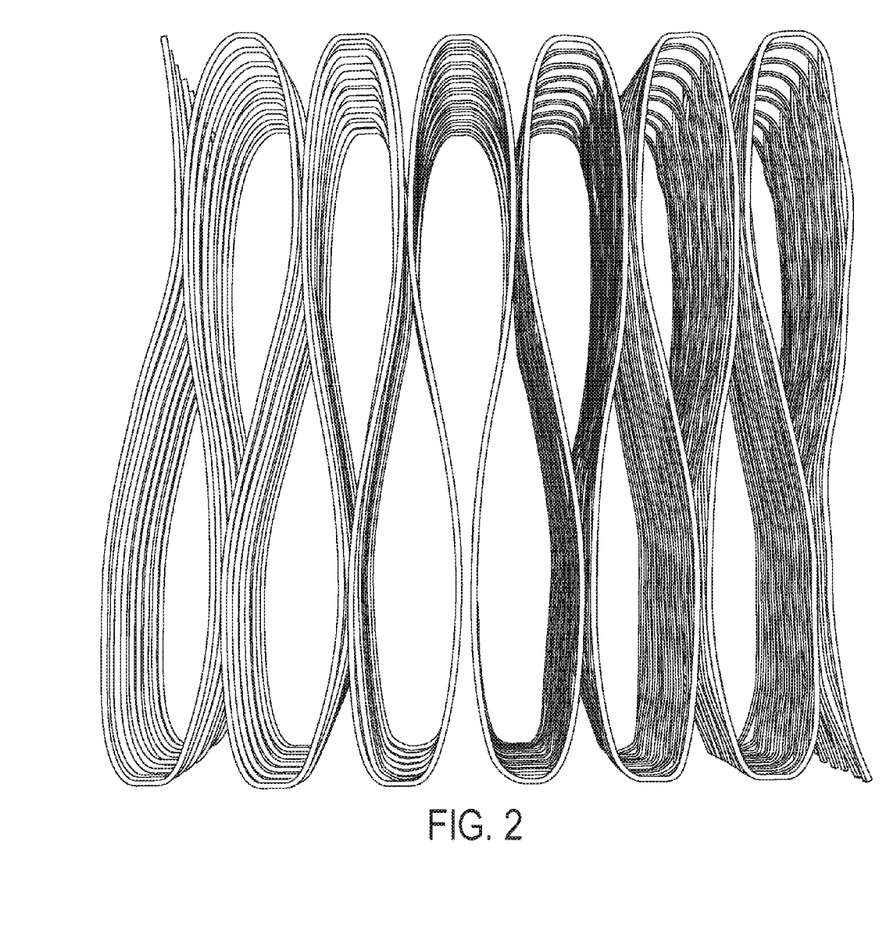
FIG. 2 illustrates a top down view of the three dimensional polymeric wave spring of FIG. 1.
Figure 3:
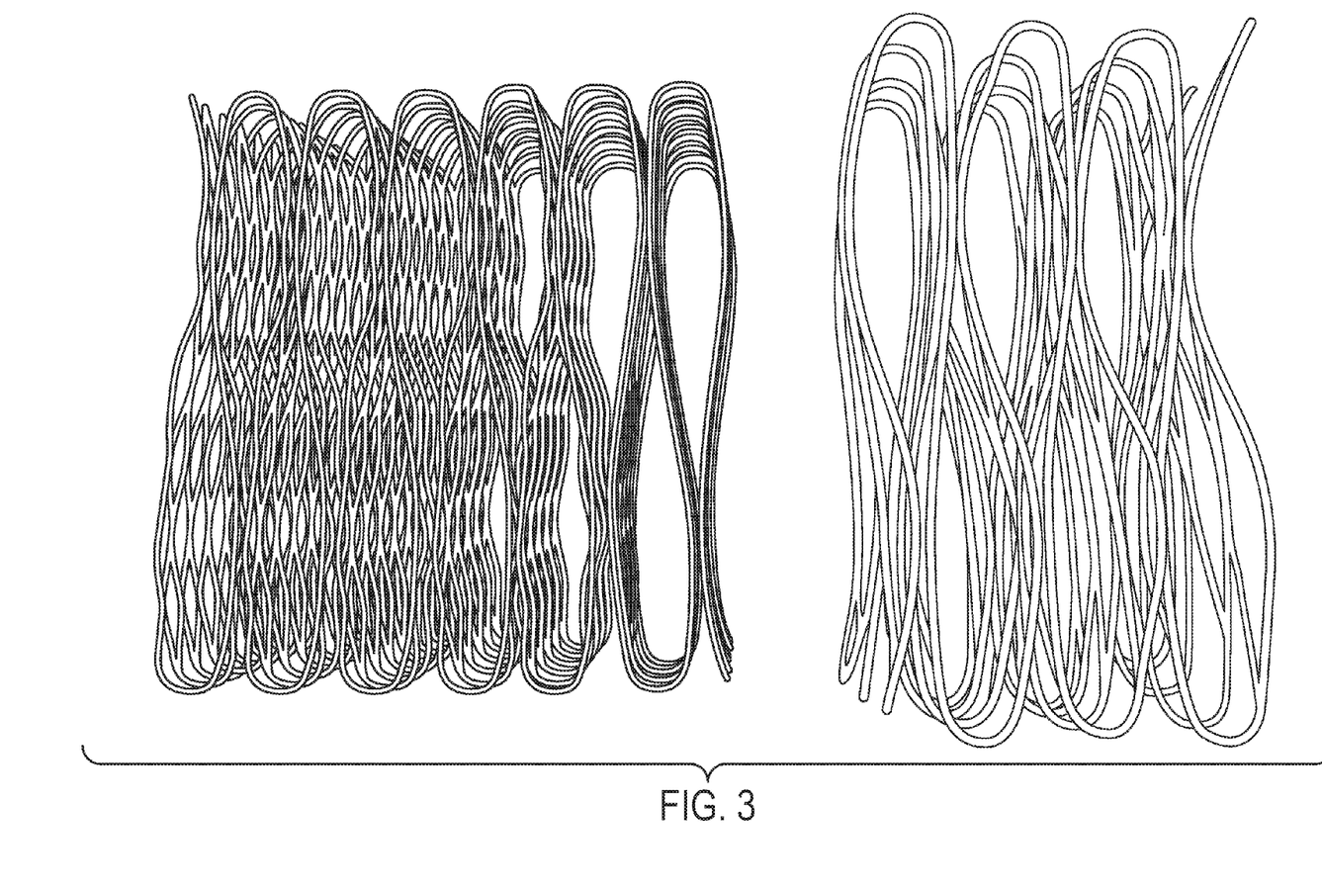
FIG. 3 illustrates a top down view of three dimensional polymeric wave springs formed of different materials and having different lattice structural dimensions.

Referring now to FIGS. 1-3 there are shown a perspective view and top down views, respectively, of three dimensional wave polymeric springs suitable for use in a cushioning article. The particular cushioning article is not intended to be limited and may include seat cushions, mattresses, and the like. For ease in understanding, reference herein will generally be made to mattresses.

As shown in FIG. 1, the perspective view of the three dimensional wave polymeric spring 10 has a polymeric lattice spring structure generally defined by a plurality of shaped strands 12 when viewed from the side. Each strand 12 is stackedly arranged with other strands 12 along a vertical axis relative to ground to a defined height (H) and has a plurality of upward 14 and downward undulations 16 defining a sinusoidal shape as shown. However, it should be noted other shapes are contemplated, e.g., diamond, so long as a compressible cellular structure is realized. Adjacent strands are generally out of phase with the corresponding underlying and/or overlying strand and can be attached to the respective strand at contact points 14, which correspond to the upward undulation in one strand and a downward undulation in an adjacent strand and vice versa. As such, the lattice spring structure includes a plurality of cells 18, i.e., openings, defined by the lattice structure, which are arranged in columns 20. The strands and the cells defined by the stackedly arranged strands are not limited to any particular cross sectional shape. For example, the strands may have a circular or any geometric shape, e.g., square, rectangular, and the like.

In one embodiment, adjacent columns can be nested together such that two sides of one closed cell in one column form sides of adjacent cells in an adjacent column. In one embodiment, each column can contain from about 2 to about 20 cells in a stacked relationship. The polymeric lattice spring structure can be designed so as to have a force displacement curve that is similar or equivalent to the force displacement curve of a conventional metal spring coil.

In some embodiments, the shaped strands 12 are not attached to one another but rather integrally formed as a complete lattice spring structure, e.g., extruded or the like to form the lattice as a complete integral structure. In this manner, the lattice spring structure has a network of strands with defined cells, i.e., openings.

The particular number of strands, the number of undulations per unit length, or the periodicity of the undulations for each one of the strands is not intended to be limited. However, the spacing defined by the interconnected undulating shaped alternating strands and number thereof will generally determine the overall height (H) thereof. For mattress applications, the height provided by the wave spring can be less than, equal to, or greater than a height dimension of the cavity depending on the particular application.

As shown in FIGS. 2-3, the wave spring 10 of FIG. 1 has an overlapping wave structure when viewed top down providing a length (L) and width (W) dimension to the three dimensional wave spring 10 that can be readily tailored to a particular application. The overlapping wave structure can be formed from a continuous sheet of the lattice spring structure overlapped at defined intervals so as to generally define a radius of curvature at each overlap, i.e., fold, as shown. The radius of curvature is not constant and can vary depending on the desired application and properties. Moreover, reference to the term radius of curvature is intended to infer that portions defining the radius may in fact be linear.

The illustrated overlap results in a tear drop shape at each end where the overlap occurs, wherein adjacent overlapped portions of the lattice structure can be fixedly attached at contact points 18 to provide increased rigidity. The illustrated three dimensional wave springs generally have an overall rectangular shape so as to conform to the general dimensions of a mattress core, for example. However, other shapes are conceivable depending on the intervals one provides in the overlapping structure, the spacing therein, and the regularity thereof. The intervals of overlap in a wave spring may be the same or different. Likewise, each end defined by the overlap can have a defined radius of curvature, constant or variable. Alternatively, each end defined by the overlap does not necessarily have to have curvature, e.g., the radius may be defined by diamond shaped, rectangular shaped, and the like.

Figure 8:
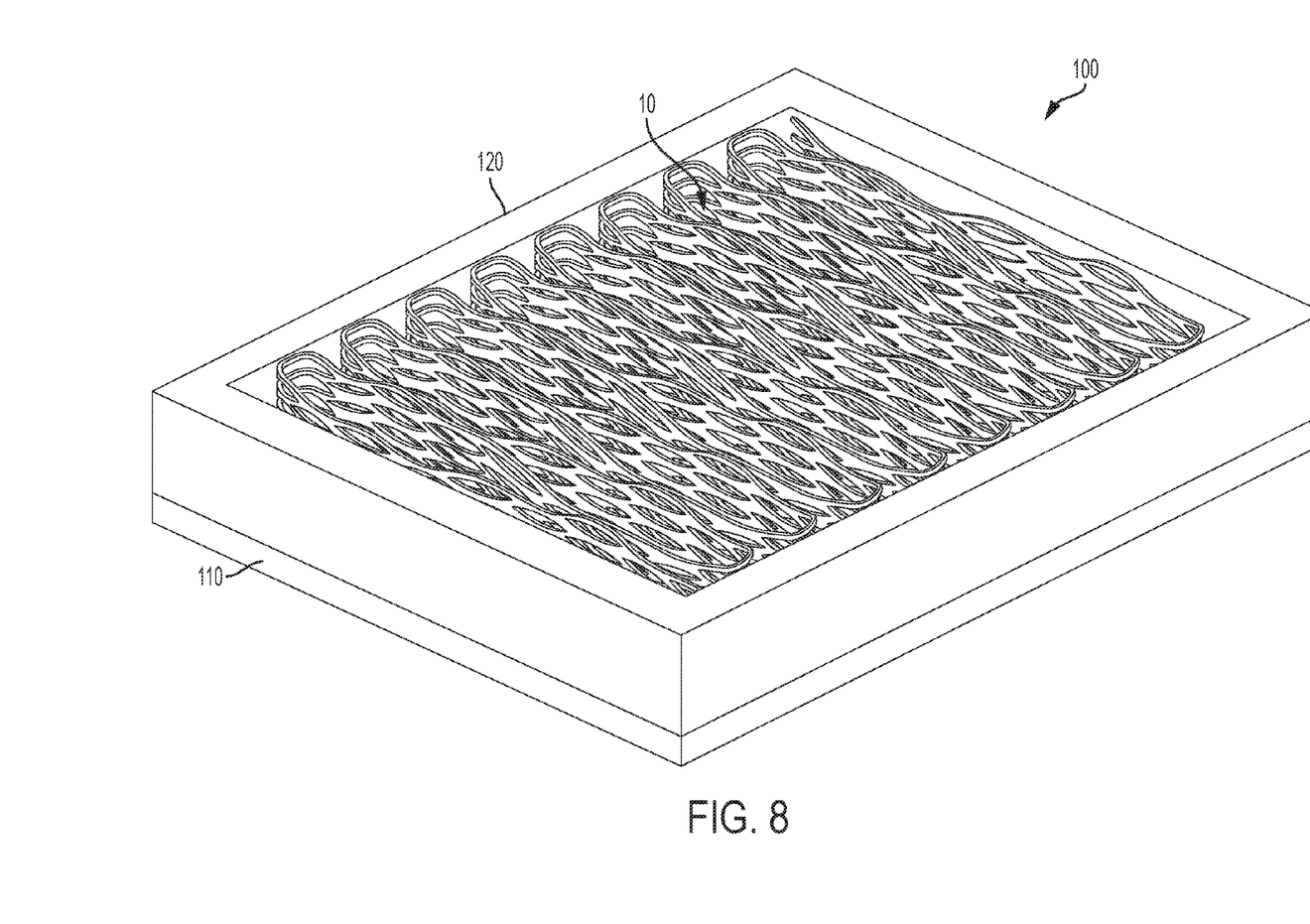
FIG. 8 depicts a perspective view of a mattress including a three dimensional polymeric wave spring in accordance with the present disclosure.

By way of non-limiting example, when utilized as a mattress core, the length, width and height dimensions of the three dimensional wave spring 10 can be tailored to fit within a foam encased cavity assembly, for example, wherein the foam encased bucket assembly 100 includes a base layer 110 and sidewalls 120 extending about a perimeter of the base layer to define a cavity within which the wave spring 10 is dimensioned to fit within the length and the width of the cavity with a height about equal to the sidewall height as shown in FIG. 8. In this manner, the wave spring can have dimensions for any desired mattress size requirements (or cushioning article). As would be apparent to those skilled in the art, in some embodiments, multiple wave springs could be coupled together or individually disposed to define portions of the overall mattress core as may be desired for some applications. The multiple wave springs may be configured with the same force displacement properties or may be configured with different force displacement properties depending on the location within the assembled mattress.

Figure 4:
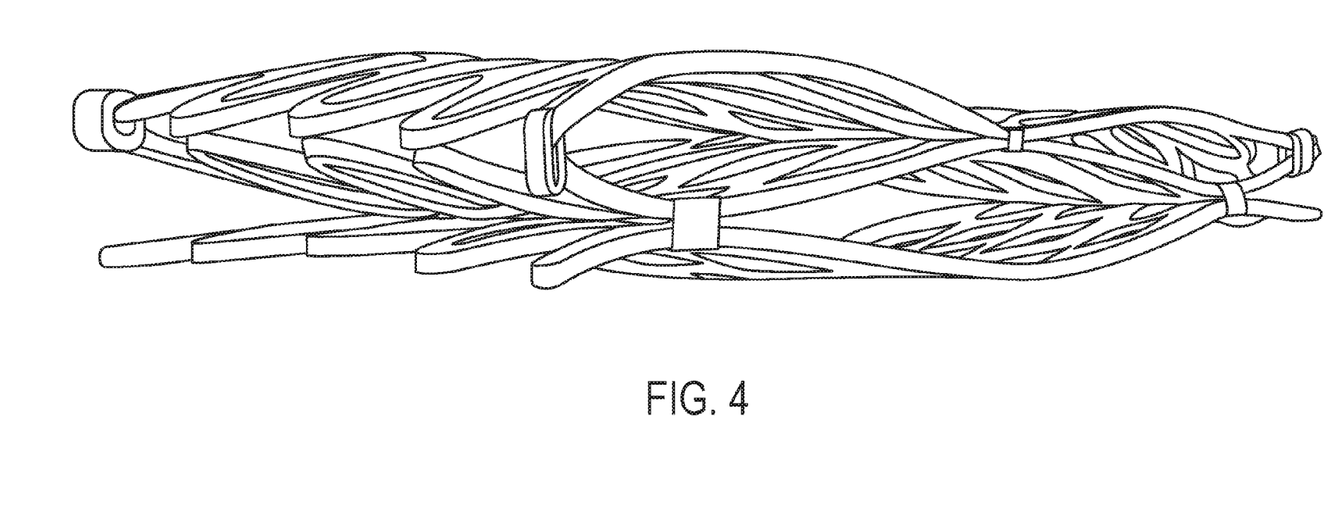
FIG. 4 illustrates a perspective view of a three dimensional polymeric wave spring formed from multiple sheets of a lattice spring structure in accordance with the present disclosure.
Figure 5:
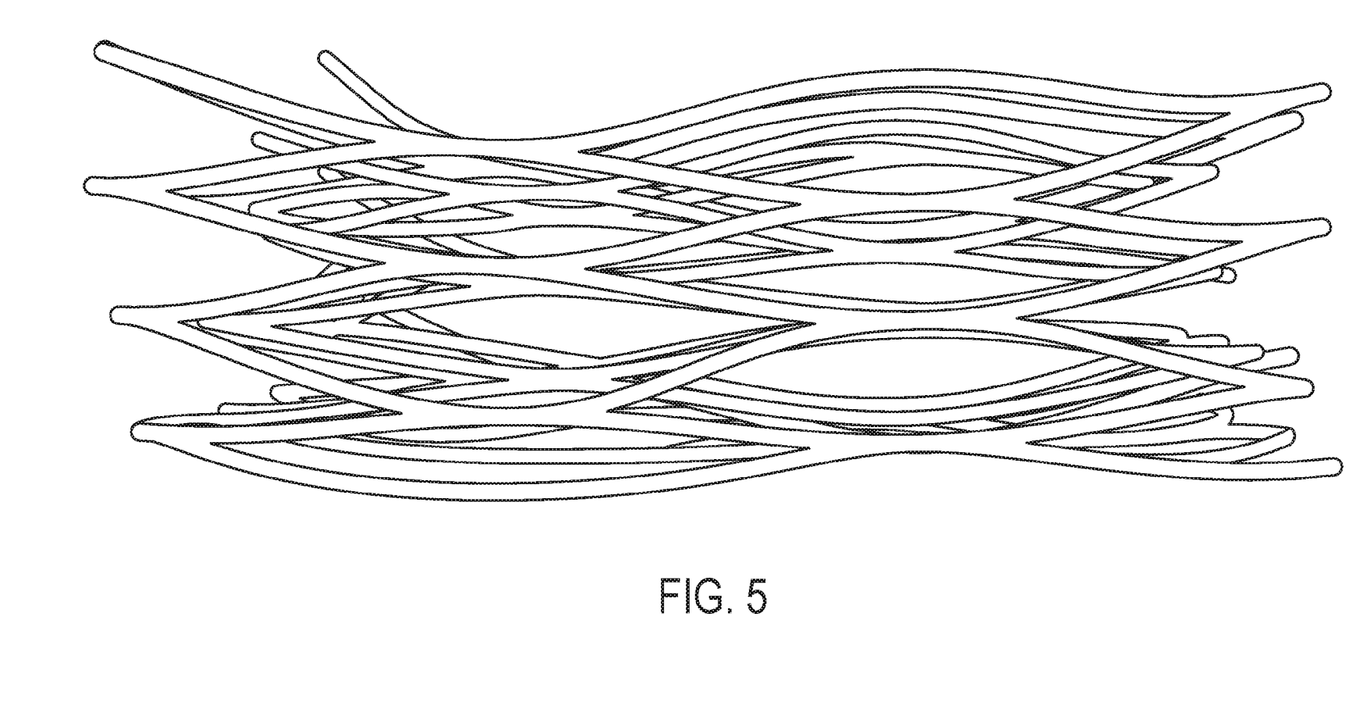
FIG. 5 illustrates a side view of the three dimensional polymeric wave spring on the right side of FIG. 3.

Optionally, as shown FIG. 4, the three dimensional wave spring is formed of multiple sheets of a lattice spring structure 100, three of which are shown, wherein the lattice structure 100 includes multiple shaped strands alternatingly arranged similar to that discussed above in FIG. 1, i.e., multiple strands having one downward undulation (minimum) and one upward undulation (maximum), that are alternatingly and stackedly arranged relative to one another and out of phase. The sheet of lattice structure itself has a non-linear shape from one end to the other end when viewed from the top down (e.g., sinusoidal, diamond, or the like) such that multiple sheets of the lattice structure arranged side-by-side in an alternating pattern provide a three dimensional lattice structure such as is shown. The corresponding minimums and maximums of the sheets of vertically arranged lattice spring structures are fastened to one another at contact points to define the wave spring. FIG. 5 provides a side view of such an arrangement.

Figure 6:
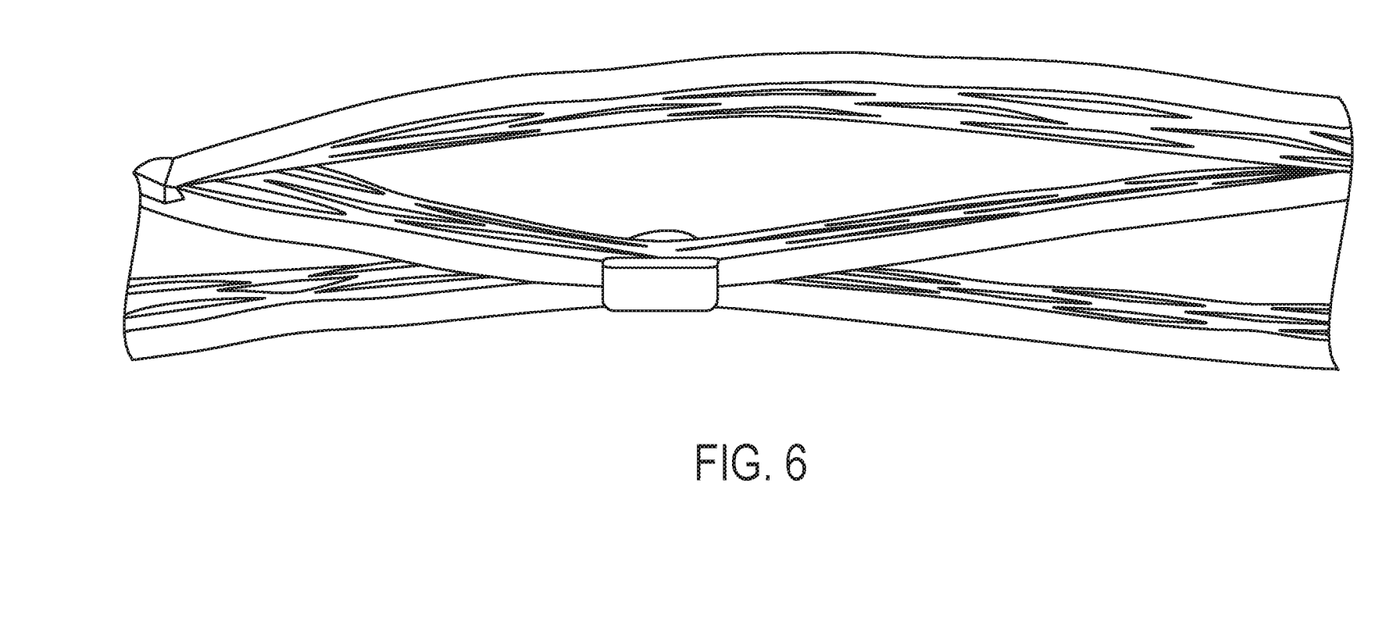
FIG. 6 illustrates a close up top down view of a fastened contact point between sheets of the lattice spring structure of the three dimensional polymeric wave spring of FIG. 4.

FIG. 6 provides a top down enlarged view depicting a single contact point between two adjacent sheets of lattice structure, wherein the contact point includes a fastener. The particular fastener is not intended to be limited. In some embodiments, the contact points are adhesively connected to one another. In other embodiments, a separate mechanical fastener is employed, and in still other embodiments, the contact points are formed by thermally bonding, e.g., ultrasonic bonding, radiofrequency bonding or the like.

Figure 7:
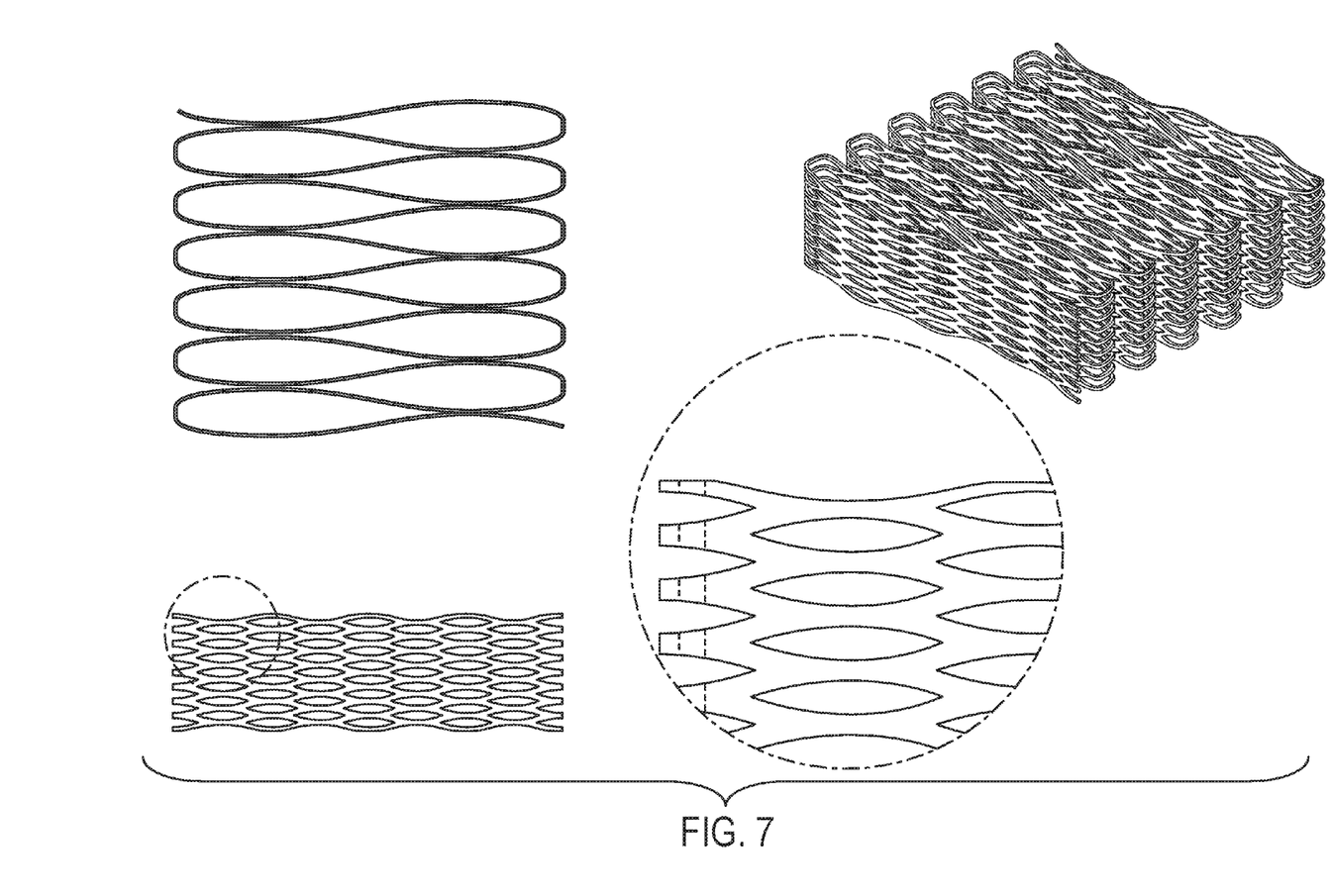
FIG. 7 schematically illustrates an exemplary three dimensional polymeric wave spring formed from a continuous sheet of a lattice spring structure.

Turning now to FIG. 7, there is shown a schematic drawing of an exemplary continuous wave spring 150. The illustrated wave spring has a height of 4 inches, a width of 12 inches and a length of 11.2 inches As previously discussed, the wave springs can be formed of a polymer and may be extruded, molded, three dimensionally printed, laser cut, stamped, combinations thereof, or the like so as to form the desired wave spring.

In one embodiment, the wave spring is dimensioned and configured from materials that provide a load deflection over a 1 square foot area of greater than about 5 pounds of force per inch (lbf/inch) to about 80 lbf/in; in other embodiments, a load deflection of about 5 lbf/in to about 50 lbf/in; and in still other embodiments, a load deflection of about 9 lbf/in to about 50 lbf/in.

In one embodiment, the wave spring is employed to define a mattress core, i.e., core chassis. Disposed about the core chassis is a foam encasement or foam side rail assembly (not shown). The foam encasement or foam side rail assembly can be rigid or semi-rigid sections coupled to one another (or alternatively, of a one-piece construction). Each section may be composed of multiple foam layers or of a unitary foam layer. The foam encasement or foam side rail assembly may also be attached to the top sheet and the rigid base sheet. Suitable materials include a variety of plastics and reinforced plastics but more commonly polyurethane foam or polyethylene foam.

The core as described above may further include one or more foam layers above the top sheet and/or below the rigid or semi-rigid base sheet. Likewise, mattress ticking as conventionally utilized in mattresses may encase the core chassis and any additional foam layers.

The polymer material used to form the spring can vary depending upon the particular application and the desired result. Suitable polymeric materials may include, but are not limited to, for example, nylons, polyethylenes, polypropylenes, polystyrenes, polyurethanes, polystyrene derivatives, acrylonitrile-butadiene-styrene copolymers, polyesters, poly-alpha-methyl-styrenes, polyvinyl chlorides, poly(meth)acrylates, polyacrylates, poly-acrylonitriles, poly-acrylonitriles, phenolic resins, polyamides, polycarbonates, polyethers, polysulfone, polyvinyl acetate, polyether ketones, epoxy resin, melamine-formaldehyde resins, or derivatives or combinations or copolymers of the polymers mentioned and any blends of two or more polymers. Advantageously, the use of polymers such as the above provides the manufacturer with the ability to recycle materials, thereby further reducing waste.

The polymer composition used to produce the polymer spring may also contain various additives such as a formaldehyde scavenger, a light stabilizer, a fire retardant, a filler, one or more lubricants, a coloring agent, an UV stabilizer, an acid scavenger, and the like.

The size and shape of the cells in the wave spring scan also vary depending upon the particular application. In one embodiment, the cellular openings are produced without the structural members having any straight lines or linear distances in order to minimize tensile stress and strain. The individual openings can have a height and a width and can have a height to width ratio from about 1:3 to about 1:20, such as from about 1:4 to about 1:10. In particular embodiments, the openings can have a curvilinear shape or an elliptical shape.

The polymer material used to construct the polymer springs of the present disclosure can vary. When selecting a polymer material, the polymer material can have, in one embodiment, an elastic modulus in a desired range. For instance, in one embodiment, the elastic modulus of the polymer material used to form the spring can be from about 800 MPa to about 1500 MPa. In addition to elastic modulus, however, there are various other properties of the polymer that may be important. For instance, other properties to consider are the recovery, creep resistance, and flex fatigue properties of the material. The flex fatigue characteristics and the creep resistance of the material, for instance, may indicate how well the particular polymer material will perform over time.

The dimensions of the openings for the polymeric wave spring may then be varied until the force displacement curve for the polymer spring matches or approximates the force displacement for the metal spring. In this manner, a polymer spring can be designed for replacing metal springs. In one embodiment, the closed cells within the lattice structure are produced without the structural members having any straight lines or linear distances in order to minimize tensile stress and strain. The individual cells can have a height and a width and can have a height to width ratio from about 1:3 to about 1:20, such as from about 1:4 to about 1:10. In particular embodiments, the cells can have a curvilinear shape or an elliptical shape.

The method of the present disclosure may also be used to design polymer springs that exhibit a desired strain limit at a particular compression. For instance, in one embodiment, a spring can be designed such that the spring exhibits no greater than about 2.5% strain at full compression. For instance, the spring can be designed such that it exhibits no greater than about 2.25% strain, such as no greater than about 2% strain, such as no greater than about 1.75% strain at full compression. Full compression is the design compression limit for the spring. For instance, under full compression, the spring may be compressed greater than 30%, greater than 40%, greater than 50%, greater than 60%, greater than 70%, and possibly even greater than 80% depending upon the particular application.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A mattress comprising:
   a base foam layer;
   a sidewall disposed about a perimeter of the base layer to define a cavity having a length, a width and a height dimension; and
   one or more three dimensional wave springs disposed within the cavity and configured to correspond to the length, the width and the height dimensions of the cavity, the one or more three dimensional wave springs comprising:
   a lattice structure comprising a plurality of alternating strands stackedly arranged to define a height dimension of the wave spring, wherein each one of the alternating strands have one or more upward and downward undulations arranged such that an upward undulation of one strand is connected to a downward undulation of an adjacent strand to define multiple cells there between arranged in columns and configured to receive a compressive force, wherein the lattice structure further comprises a non-linear shape when viewed top down, wherein the non-linear shape of the lattice structure defines a length and a width dimension of the one or more three dimensional wave springs, and wherein the non-linear shape of the lattice structure when viewed top down is defined by a continuous sheet of the lattice structure folded back and forth over itself at defined intervals.

2. The mattress of claim 1, wherein the non-linear shape of the lattice structure when viewed top down comprises a plurality of the lattice structures in a side by side relationship and coupled at contact points.

3. The mattress of claim 1, wherein the height dimension of the one or more three dimensional wave springs is equal to the height dimension of the cavity.

4. The mattress of claim 1, wherein the one or more three dimensional wave springs are formed of a polymer.

5. The mattress of claim 4, wherein the polymer comprises nylon, polyethylenes, polypropylenes, polystyrenes, polyurethanes, polystyrene derivatives, acrylonitrile-butadiene-styrene copolymers, polyesters, poly-alpha-methyl-styrenes, polyvinyl chlorides, poly(meth)acrylates, polyacrylates, poly-acrylonitriles, polyacrylonitriles, phenolic resins, polyamides, polycarbonates, polyethers, polysulfone, polyvinyl acetate, polyether ketones, epoxy resin, melamine-formaldehyde resins, or derivatives or combinations or copolymers of the polymers mentioned and any blends of two or more polymers.

6. The mattress of claim 4, wherein the polymer is selected to have an elastic modulus of about 800 MPa to about 1500 MPa.

7. The mattress of claim 1, wherein the multiple cells have a height and a width, the height to width ratio of each cell being from about 1:3 to about 1:20.

8. The mattress of claim 1, wherein each one of the multiple cells has a curvilinear shape or an elliptical shape.

9. The mattress of claim 1, wherein each column of cells defined by the lattice structure contains from 2 to 20 cells.

10. The mattress of claim 1, wherein the non-linear shape of the lattice structure is sinusoidal or diamond shaped.

11. A three dimensional polymeric wave spring comprising:
a lattice structure comprising a plurality of alternating strands of a polymer stackedly arranged to define a height dimension of the wave spring, wherein each one of the alternating strands have one or more upward and downward undulations arranged such that an upward undulation of one strand is connected to a downward undulation of an adjacent strand to define multiple cells there between arranged in columns and configured to receive a compressive force, wherein the lattice structure further comprises a non-linear shape when viewed top down, wherein the non-linear shape of the lattice structure defines a length and a width dimension of the one or more three dimensional wave springs, and wherein the non-linear shape of the lattice structure when viewed top down is defined by a continuous sheet folded back and forth over itself at defined intervals.

12. The three dimensional polymeric wave spring of claim 11, wherein the non-linear shape of the lattice structure when viewed top down comprises a plurality of the lattice structures in a side by side relationship coupled at contact points.

13. The three dimensional polymeric wave spring of claim 11, wherein the height dimension of the one or more three dimensional wave springs is equal to the height dimension of the cavity.

14. The three dimensional polymeric wave spring of claim 11, wherein the polymer comprises nylon, polyethylenes, polypropylenes, polystyrenes, polyurethanes, polystyrene derivatives, acrylonitrile-butadiene-styrene copolymers, polyesters, poly-alpha-methyl-styrenes, polyvinyl chlorides, poly(meth)acrylates, polyacrylates, poly-acrylonitriles, polyacrylonitriles, phenolic resins, polyamides, polycarbonates, polyethers, polysulfone, polyvinyl acetate, polyether ketones, epoxy resin, melamine-formaldehyde resins, or derivatives or combinations or copolymers of the polymers mentioned and any blends of two or more polymers.

15. The three dimensional polymeric wave spring of claim 11, wherein the polymer is selected to have an elastic modulus of about 800 MPa to about 1500 MPa.

16. The three dimensional polymeric wave spring of claim 11, wherein the multiple cells have a height and a width, the height to width ratio of each cell being from about 1:3 to about 1:20.

17. The three dimensional polymeric wave spring of claim 11, wherein each one of the multiple cells has a curvilinear shape or an elliptical shape.

18. The three dimensional polymeric wave spring of claim 11, wherein each column of cells defined by the lattice structure contains from 2 to 20 cells.

19. The three dimensional polymeric wave spring of claim 11, wherein the non-linear shape of the lattice structure is sinusoidal or diamond shaped.

* * * * *